T. E. BRIDGMAN.
DETACHABLE RIM FLANGE FOR THE WHEELS OF MOTOR CARS AND OTHER VEHICLES.
APPLICATION FILED NOV. 18, 1910.
997,745.
Patented July 11, 1911.
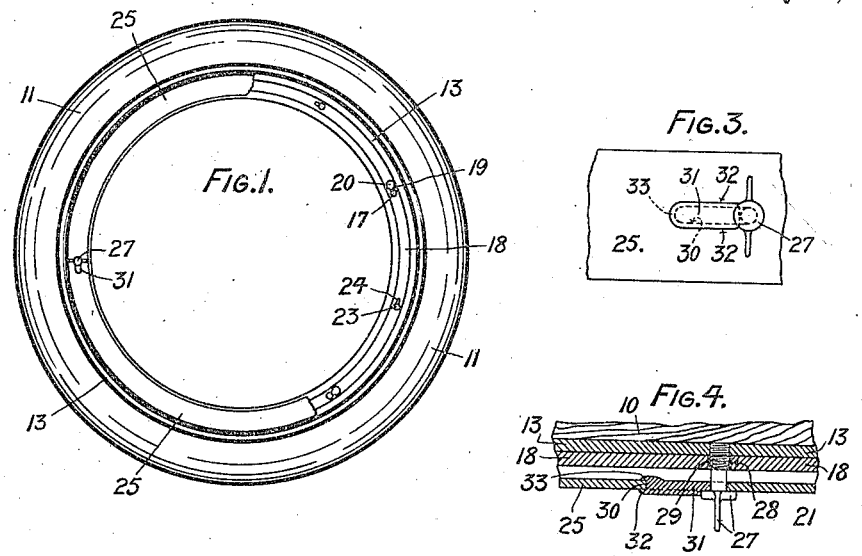
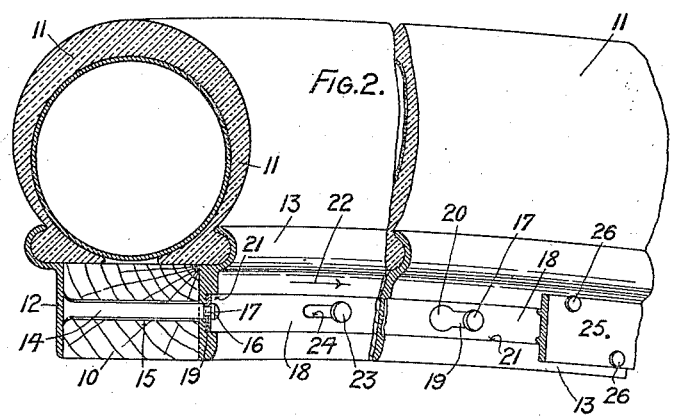
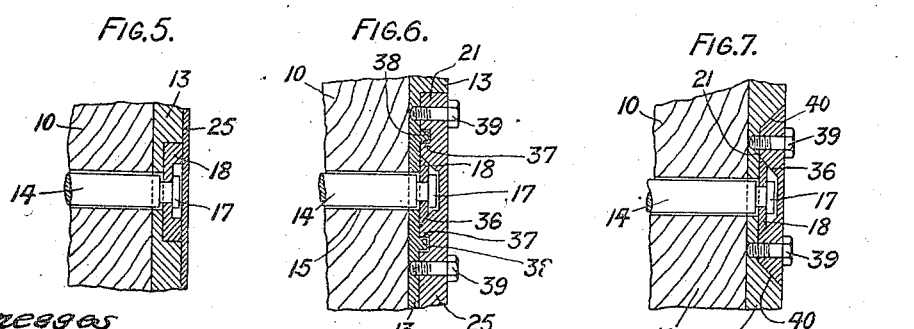
Witnesses
Inventor
T. E. Bridgman

UNITED STATES PATENT OFFICE.

THOMAS EDWARD BRIDGMAN, OF SWANSEA, ENGLAND.

DETACHABLE RIM-FLANGE FOR THE WHEELS OF MOTOR-CARS AND OTHER VEHICLES.

997,745. Specification of Letters Patent. Patented July 11, 1911.

Application filed November 18, 1910. Serial No. 593,082.

*To all whom it may concern:*

Be it known that I, THOMAS EDWARD BRIDGMAN, subject of the King of England, residing at 15 Heathfield street, Swansea, Glamorgan, England, have invented certain new and useful Improvements in Detachable Rim-Flanges for the Wheels of Motor-Cars and other Vehicles, of which the following is a specification.

This invention has reference to detachable rim flanges for the wheels of motor and other vehicles, and has reference more particularly to removable rim flanges which are secured in position by means of bolts and rotatable plates; and one of the objects of this invention is to provide a vehicle wheel with improved means of this kind for manipulating a tire thereon, and for removing, replacing, repairing or otherwise dealing with the same, and in the case of a pneumatic tire, it provides an improved means of this kind for facilitating the removal or other operation of either the inner tube or outer cover, and is of simple and cheap construction, of easy operation enabling any attention necessary to the tire to be effected in a comparatively short space of time, and very efficient and secure in use for retaining the tire in position on the felly of the wheel.

The above objects and effects are attained by means of a wheel having a felly fitted with a detachable rim flange which is provided with a number of bolts, which are adapted to engage with a locking means provided on the opposite face of the felly to that against which the detachable rim flange bears; the locking means being adapted to be operated by a knob or handle attached thereto, and to be inclosed by a part built on or attached to the felly, and adapted to lock and unlock all the bolts, collectively, that is, the locking means is adapted to engage or disengage all the bolts at one and the same time, and thus enable the operation of removing the rim flanges to be effected quickly and with facility.

Referring to the drawings, Figure 1 is a side elevation of a motor vehicle wheel fitted with the invention, a part being broken away to show the locking means. Fig. 2 is a perspective cross sectional view to a larger scale of one type of a similar wheel showing the details thereof. Figs. 3 and 4 are enlarged views of a detail hereinafter referred to. Figs. 5, 6, and 7, are sectional views of a modification of the arrangement shown in Figs. 1 and 2.

Referring to Figs. 1 and 2, 10 designates the felly of a wheel, and 11 a pneumatic tire of the known construction, the edges of the cover of which are adapted to be held in place by side or rim flanges 12 and 13, that is, by the outer edge of such rim flanges engaging with the thickened parts or edges of the outer cover, although it will be understood that such rim flanges may be of different construction, and be adapted to grip, hold or secure the edges of the outer cover against the sides of the felly of the wheel. Further, such rim flanges may be adapted to retain in position any form of tire other than pneumatic. In the form of construction shown in Figs. 1 and 2, the rim flange 12 is provided with a series of bolts, 14, which are adapted to pass through holes 15 formed in the said felly of the wheel, and their outer ends are provided with a reduced portion 16 and head 17, which outer ends are adapted to be engaged by the locking means, consisting of a rotatable plate 18, provided with elongated apertures 19, such apertures 19 having enlarged ends 20 for the passage of the heads of the bolts, 17. The locking means or plate 18 is adapted to be rotated, or moved in a circular manner, in a channel or recess 21 formed in the rim flange 13, and adapted to receive and correspond with the locking plate 18. The locking plate 18 in Fig. 2 is shown in the locking position, that is, the pins 14 are engaged thereby, that portion of the elongated apertures which is of least width, being engaged with the reduced end portion 16 of the pins. To unlock the locking plate 18, it is moved in the direction of the arrow 22 (Fig. 2) so as to bring the enlarged end 20 of the aperture 19 about the bolts 14, such enlarged end permitting the enlarged end or head of the bolt to pass through the said aperture and to be disconnected from the locking plate, thus enabling the rim plate 12 to be removed from the side of the felly 10. The preferred arrangement is for the rim flange 12 to be on the outer side of the wheel, and the locking means and rim plate 13 (which is attached to the felly) to be on the inner side so that the locking means shall be protected, and the rim plate 12 easily removed. The locking plate 18 is held in position by means of pins or screws 23 which pass through slots 24 in the locking plate, and engage with the rim flange 13. The slots 24 serve as guides for the locking plate, and also retain it in position within the circular way or recess 21 against the bottom face of the recess in the rim plate. To prevent dust, dirt, and any deteriorating matters having access to the locking plate or the recess in which it is retained, a protecting plate 25 is provided and adapted to be attached to the rim flange by means of screws or their equivalent 26, such protective plate inclosing the locking plate, within its groove and preventing any moisture, dust, dirt, or the like, entering therein.

The means for operating the locking means which is shown in Figs. 3 and 4, comprises a hand bolt or knob 27 which passes through an aperture 28 formed in the locking plate, and is adapted to screw into and engage with the rim flange 13, as shown, when the locking plate is in position. This locking means, as shown in Fig. 4, is provided with an enlarged inner end 29, so that when the locking pin is unscrewed to the unlocking position, it will prevent the locking pin being entirely removed from the locking and protecting plates. An aperture 30 is provided in the protecting plate 25 for the travel of the locking pin, such aperture corresponding in length to the apertures in the locking plate 18. When the locking pin is in the locked position, as shown in Figs. 3 and 4, unprotected parts of the aperture 30 would be left and would admit water, dirt, and any other deteriorating matter into the space occupied by the unlocking plate. To protect and close this aperture 30, a plate 31 is provided which is provided with overlapping edges 32 and a lip 33, the latter being adapted to take under the protecting plate 25, and the former to extend beyond the edges of the aperture 30, while that end of the plate 31 which abuts against the locking pin, is so constructed as to take under the enlarged head of the latter, and to be held in position thereby when the locking pin is in the locked position. The plate is removed by unscrewing the locking pin.

The operation of the whole of the device is as follows: If the tire is to be attended to and requires the removal or opening of the cover thereof, the locking pin is unscrewed out of engagement from the inner rim flange 13, such unscrewing of the locking pin enabling the plate 31 to be removed from the aperture 30, and permitting the locking pin to be moved to the opposite end of the said aperture, such moving of the locking means imparting a corresponding movement to the locking plate 18, and unlocking the bolts 14, which unlocking permits these to be withdrawn from the holes in the felly by means of the outer rim flange or plate 12, and also the removal of this plate 12, which permits access to the tire to be obtained. It will be seen that all of the bolts will be concurrently locked or unlocked by the movement of the locking plate, such locking or unlocking being effected quickly and easily, and with facility. Also such said locking means will be very secure and of easy and simple construction.

A hole may be provided in the inner rim plate for receiving the locking pin when this is moved to the unlocked position, until the outer rim plate 12 is again replaced and engaged.

Referring to the modifications shown in Figs. 5, 6, and 7, the inner rim flange 13 is recessed in a similar manner to that shown in Fig. 2, while the locking plate 18, shown in Fig. 5, is recessed at that part in which the head 17 of the bolt 14 occurs, while the outer margins of the plate are the same thickness as the depth of the recess 21, and the outer surface of such locking means is adapted to bear against, or be in contact with the protecting plate 25.

The arrangements shown in Figs. 6 and 7 are of similar construction with the exception that the protecting plate 25 is adapted to take into a recess 21, with the outer surface of such plate 25 flush with the inner rim plate 13. The inner surface of the protecting plate 25 is beveled at 36 and the edges of the locking plate 18 are adapted to correspond thereto. This shaping of the locking and protecting plates serves to more effectually secure the locking plate in position. Further, the protecting plate 25 is recessed or channeled as at 37, and the rim flange 13 is provided with upstanding edges or ribs 38 adapted to take into such channels 37 with packing therebetween. The protecting plate 25 is secured in position by means of screws 39 as shown. The arrangement shown in Fig. 7 is similar to that shown in Fig. 6, that is, the protecting plate 25 is adapted to be fitted into the inner rim plate, the surface of both being flush with each other, while the inner edges 40 of the protecting plate are beveled, as well as the edges of the recess 21, as a further means of fitting the protecting plate in position.

By the above described arrangements and modifications, it will be obvious that the removable rim flange or plate of a vehicle wheel can be easily and quickly removed, while at the same time the means for securing the bolts or other engaging means in position are effectually protected from any deteriorating influences.

It is to be stated that it has been proposed heretofore to provide means for securing the locking ring in position, and it has also been previously proposed to attach a cover to the locking ring for covering the ends of the securing bolts, and no broad claim is made to either of these features *per se.*

What is claimed is:—

1. A vehicle wheel comprising a felly with a plurality of holes; a detachable rim flange with a plurality of pins which take into the said holes, and are provided with reduced portions in their length and heads; a partially rotatable locking ring having elongated apertures with enlarged ends for the passage of the pins and engagement with the heads thereof, and slots of predetermined length; pins for attaching the locking plate to the said felly and which engage with the said slots; a permanently secured protecting cover plate inclosing the locking ring; said cover plate having a slot, a locking pin passing through the slot and engaging an opening in the rim flange, a plate having inner and outer flanges fitting in the slot, one edge of the plate being shaped to engage the pin and the inner and outer flanges engaging the walls of the slot, said pin and plate serving to hold the cover plate in locked position.

2. A vehicle wheel comprising a felly having a plurality of holes formed therein; a rim flange fixed to the felly having holes corresponding to those in the felly; said fixed rim flange having a circular recess; a detachable rim flange with a plurality of pins which take into the said holes, and are provided with reduced portions in their length and heads; a partially rotatable locking ring which takes into the circular recess in the fixed rim flange and having elongated apertures with enlarged ends for the passage of the pins and engagement with the heads thereof, and slots of predetermined length; pins for attaching the locking plate to the said felly and which engage with the said slots; a cover plate for the locking ring secured to the fixed rim flange and having an aperture; and a device which extends through the aperture in the cover plate and engages with the locking ring and serves to move it in opposite directions and to secure it in position.

3. A vehicle wheel comprising a detachable rim flange provided with means for securing it to a perforated wheel felly and comprising headed pins, and an apertured and slotted and partially rotatable locking ring; means for inclosing the latter having an aperture formed therein; fastening devices for permanently securing the inclosing means to the wheel; a device which extends through the aperture in the said means and engages with the locking plate and enables it to be partially rotated in opposite directions; means for loosely securing said device to the inclosing means to retain it in position irrespective of the position of the locking ring; and a closure plate which takes into the aperture in the said means.

4. A vehicle wheel comprising a detachable rim flange provided with means for securing it to a perforated wheel felly and comprising headed pins, and an apertured and slotted and partially rotatable locking ring; a fixed rim flange; a cover plate for the locking ring having an aperture; means for securing the cover to the fixed rim flange; a device which extends through the aperture in the cover plate and engages with the locking ring and the fixed rim flange; means for holding the latter device in relation to the locking ring irrespective of its position, and a closure plate which takes into the aperture in the cover plate and engages with the edges of the aperture formed therein and the said device.

5. A vehicle wheel comprising a felly having a plurality of holes formed therein; a rim flange fixed to the felly having holes corresponding to those in the felly; said fixed rim flange having a circular recess and a screw hole; a detachable rim flange with a plurality of pins which take into the said holes, and are provided with reduced portions in their length and heads; a partially rotatable locking ring which takes into the circular recess in the fixed rim flange and having elongated apertures with enlarged ends for the passage of the pins and engagement with the heads thereof, and slots of predetermined length; pins for attaching the locking plate to the said felly and which engage with the said slots; a cover plate for the locking ring secured to the fixed rim flange and having an aperture; a screw threaded pin having an enlarged screw threaded portion and a head, at opposite ends of its shank, and which extends through the aperture, the screw threaded portion extending through the locking ring and engaging with the screw hole in the fixed rim flange; and a closure plate having at one end a lip which engages with the edge of the aperture in the cover plate, and at the other end a shaped part which takes under the head of the said screw threaded pin.

6. A vehicle wheel, comprising a felly having a plurality of openings, a rim flange fixed to the felly having openings corresponding to those in the felly and a circular recess, a detachable rim flange provided with a plurality of pins fitting in the said openings, said pins having reduced portions, a partially rotatable locking ring fitting in the recess in the fixed rim flange and having elongated slots with enlarged ends for the passage of the pins, means for securing the locking ring, a cover plate formed with an annular recess to receive the ends of the pins, and also formed with a slot, means for rigidly fastening the cover plate to the fixed rim flange, detachable means for securing the rotatable locking ring in locked position, said means having a flange to limit its outward movement to prevent it passing through the slot in the cover plate and to provide a finger piece for moving the locking ring.

7. A vehicle wheel, comprising a felly having a plurality of openings, a rim flange fixed to the felly having openings corresponding to those in the felly and a circular recess, a detachable rim flange provided with a plurality of pins fitting in the said openings, said pins having reduced portions, a partially rotatable locking ring fitting in the recess in the fixed rim flange and having elongated slots with enlarged ends for the passage of the pins, means for securing the locking ring, a cover plate formed with an annular recess to receive the ends of the pins, and means coöperating with the cover plate for locking and unlocking the rotating locking plate.

8. In a wheel, the combination of a felly, a detachable rim flange on the felly, pins extending from said detachable rim flange and formed near their ends with grooves, a fixed rim flange formed with openings to receive the pins and an annular recess, a rotating locking ring fitting in the recess and formed with elongated slots with enlarged ends in which the ends of the pins pass, a cover plate fixed to the fixed rim and provided with a recess to receive the ends of the pins, said cover plate having a slot, a screw having a head and a shoulder, said screw locking the locking ring against rotation when the head engages the cover plate, the shoulder limiting the outward movement of the screw and thereby retaining its end in the opening in the locking ring, whereby by moving the said screw in the slot in the cover plate the locking ring can be moved to release or lock the locking pins.

In testimony whereof I affix my signature in presence of two witnesses.

THOMAS EDWARD BRIDGMAN.

Witnesses:
LLEWELYN R. EVANS,
WILLIAM D. REES.